(12) United States Patent
Colombier et al.

(10) Patent No.: US 11,948,162 B2
(45) Date of Patent: Apr. 2, 2024

(54) PRESENTING CROSS-SELL PRODUCTS FOR A GIVEN PRODUCT

(71) Applicant: Content Square SAS, Paris (FR)

(72) Inventors: Michael Colombier, Paris (FR); Fatiha Achour, Paris (FR); Manuel Cornu, Paris (FR); Martin De Charette, Paris (FR); Alfredo Castro, Paris (FR); Filipe Posteral, Paris (FR); Krongkarn Jitsil, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/732,044

(22) Filed: Apr. 28, 2022

(65) Prior Publication Data

US 2023/0214854 A1 Jul. 6, 2023

Related U.S. Application Data

(60) Provisional application No. 63/295,377, filed on Dec. 30, 2021.

(51) Int. Cl.
*G06Q 30/0201* (2023.01)
(52) U.S. Cl.
CPC ................. *G06Q 30/0201* (2013.01)
(58) Field of Classification Search
None
See application file for complete search history.

(56) References Cited

U.S. PATENT DOCUMENTS 9,483,789 B1 * 11/2016 Hanlon ............. G06Q 30/0631
9,569,419 B1 * 2/2017 Rice ................... G06Q 30/0631
(Continued)

FOREIGN PATENT DOCUMENTS

EP 3699857 8/2020
KR 102249151 B1 * 5/2021 ......... G06Q 30/0633
(Continued)

OTHER PUBLICATIONS

"Cross-Selling Analytics: Discovering the Correlation Matrix." Jul. 2018. Retrieved from {URL: https://shoppermotion.com/blog/cross-selling-analytics-correlation-matrix/}. (Year: 2018).*
(Continued)

*Primary Examiner* — Susanna M. Diaz
(74) *Attorney, Agent, or Firm* — Schwegman Lundberg & Woessner, P.A.

(57) ABSTRACT

Aspects of the present disclosure involve a system comprising a computer-readable storage medium storing a program and method for presenting cross-sell products. The program and method provide for receiving indication of a user selection to display cross sell data for at least one product made available for purchase by a website; determining a set of cross-sell products for the at least one product, each cross-sell product in the set of cross-sell products having been previously sold together with the at least one product in association with website; determining, for each cross-sell product in the set of cross-sell products, a set of metrics that relate the cross-sell product to the at least one product; and causing, for each cross-sell product in the set of cross-sell products, display of the respective set of metrics that relate the cross-sell product to the at least one product.

20 Claims, 10 Drawing Sheets

(56) References Cited

U.S. PATENT DOCUMENTS

| | | | |
|---|---|---|---|
| 2002/0065912 A1* | 5/2002 | Catchpole | H04L 9/40 |
| | | | 713/168 |
| 2002/0083067 A1 | 6/2002 | Tamayo et al. | |
| 2004/0059624 A1* | 3/2004 | Wantulok | G06Q 30/0203 |
| | | | 705/7.32 |
| 2008/0027796 A1* | 1/2008 | Chaves | G06Q 30/0277 |
| | | | 705/14.51 |
| 2008/0249837 A1* | 10/2008 | Angell | G06Q 30/0201 |
| | | | 705/7.29 |
| 2014/0156347 A1* | 6/2014 | Agrawal | G06Q 30/0202 |
| | | | 705/7.31 |
| 2014/0358665 A1* | 12/2014 | Gopalsamy | G06Q 30/0276 |
| | | | 705/14.72 |
| 2015/0242893 A1* | 8/2015 | Mirchandani | G06Q 30/0641 |
| | | | 705/14.53 |
| 2016/0191351 A1* | 6/2016 | Smith | H04L 43/045 |
| | | | 709/219 |
| 2017/0148037 A1* | 5/2017 | Sengupta | G06Q 30/0206 |
| 2017/0228808 A1* | 8/2017 | Kumar | G06Q 30/0206 |
| 2017/0287044 A1* | 10/2017 | Rose | H04L 67/306 |
| 2017/0293695 A1* | 10/2017 | Brovman | G06Q 30/0251 |
| 2017/0323026 A1* | 11/2017 | Le Bras | G06F 16/2358 |
| 2019/0026761 A1* | 1/2019 | Jain | G06Q 30/0202 |
| 2019/0164176 A1* | 5/2019 | Pydynowski | H04L 67/535 |
| 2021/0233150 A1* | 7/2021 | Korpeoglu | G06F 16/24578 |
| 2022/0291931 A1* | 9/2022 | Cartan | G06F 9/451 |

FOREIGN PATENT DOCUMENTS

| | | | | |
|---|---|---|---|---|
| WO | WO-0177926 A1 * | 10/2001 | | G06Q 30/02 |
| WO | 2023126888 | 7/2023 | | |

OTHER PUBLICATIONS

"International Application Serial No. PCT/IB2022/062918, International Search Report dated Feb. 13, 2023", 3 pgs.

"International Application Serial No. PCT/IB2022/062918, Written Opinion dated Feb. 13, 2023", 5 pgs.

* cited by examiner

FIG. 6

PRESENTING CROSS-SELL PRODUCTS FOR A GIVEN PRODUCT

CLAIM OF PRIORITY

This Application claims the benefit of priority of U.S. Provisional Application No. 63/295,377, filed Dec. 30, 2021, which is hereby incorporated by reference in its entirety.

BACKGROUND

Web analysis solutions provide for the collection and analysis of website data. Such solutions may provide for the analysis of individual webpage visits, including merchandising analysis.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 6 illustrates an example user interface for expanding the list of products to cross-sell with respect to a specific product, in accordance with some examples.

DETAILED DESCRIPTION

Web analysis solutions provide for the collection and analysis of website data. Such solutions may provide for the analysis of individual webpage visits, including merchandising analysis. Some systems may implement cross-selling of products, for example, by relying on personalization tools. However, such systems typically require rules to be configured manually. As such, it may be desirable to improve cross-sell insights.

The disclosed embodiments allow an operator/agent to find out which products have been sold in grouped orders with others, and to maximize or otherwise improve sales strategy by suggesting products that interest visitors together.

With respect to cross-selling, the merchandising interface includes an interface element (e.g., a tab) that allows a user (e.g., administrator, operator) to view products at a product level, a category level or a brand level. For each given product, the merchandising interface presents a list of additional products to cross-sell with that product. For example, the additional products correspond to those previously sold together with the given product.

From a product, category or brand overview page, the operator can select a cross-sell tab to view a list of all products that have been sold along with the given product (or group of given products). The end user can click on any of the products of the cross-sell list to refine searching to this specific product.

Thus, the disclosed embodiments provide for receiving indication of a user request to present cross-sell data for at least one product made available for purchase by a website. A set of cross-sell products are determined for the at least one product, with each cross-sell product in the set of cross-sell products having been previously sold together with the at least one product in association with website. For each cross-sell product in the set of cross-sell products, a set of metrics are determined that relate the cross-sell product to the at least one product. For each cross-sell product in the set of cross-sell products, the respective set of metrics that relate the cross-sell product to the at least one product is displayed.

Networked Computing Environment

Figure 1:
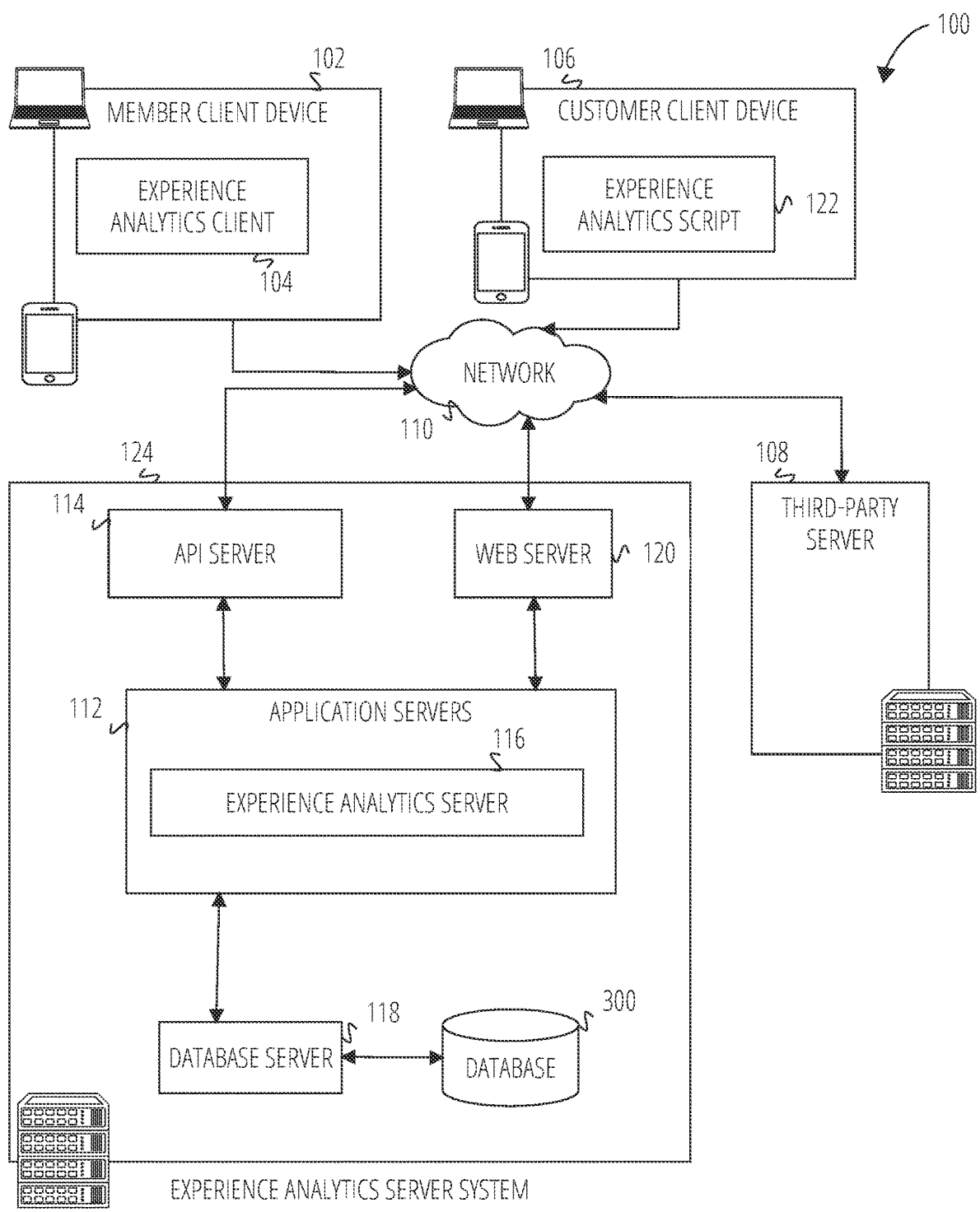
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
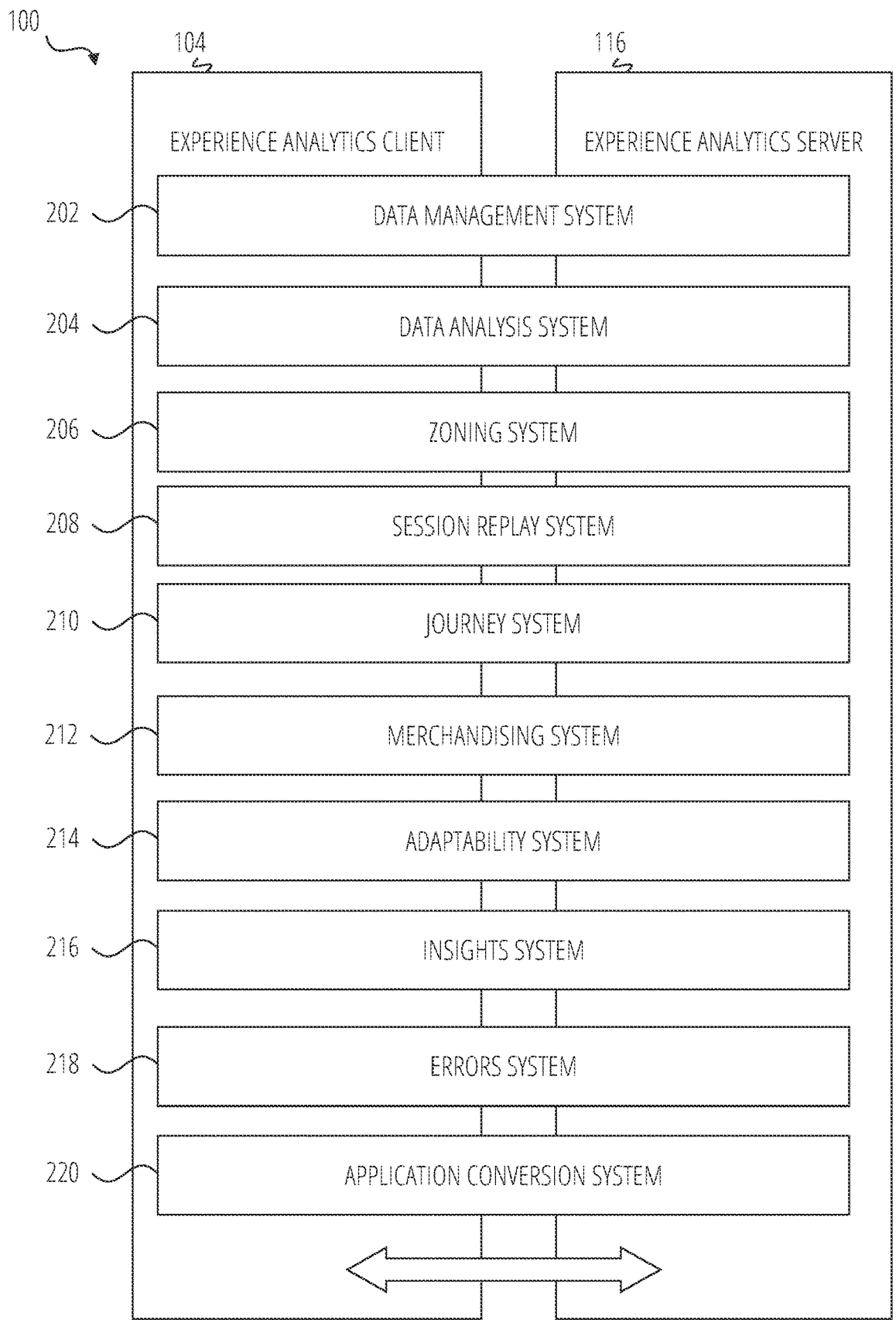
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, an experience analytics server 116, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc.

In addition, the merchandising interface includes an interface element that allows a user (e.g., administrator, operator) to view products at a product level, a category level or a brand level. For each given product, the merchandising interface is configured to generate and present a list of additional products to cross-sell with that product. The list of additional products for cross-selling may be generated based on data records associating the additional products as being previously sold together with the given product. For example, the merchandising system 212 is configured to generate and store such records in the database 300.

Moreover, the merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
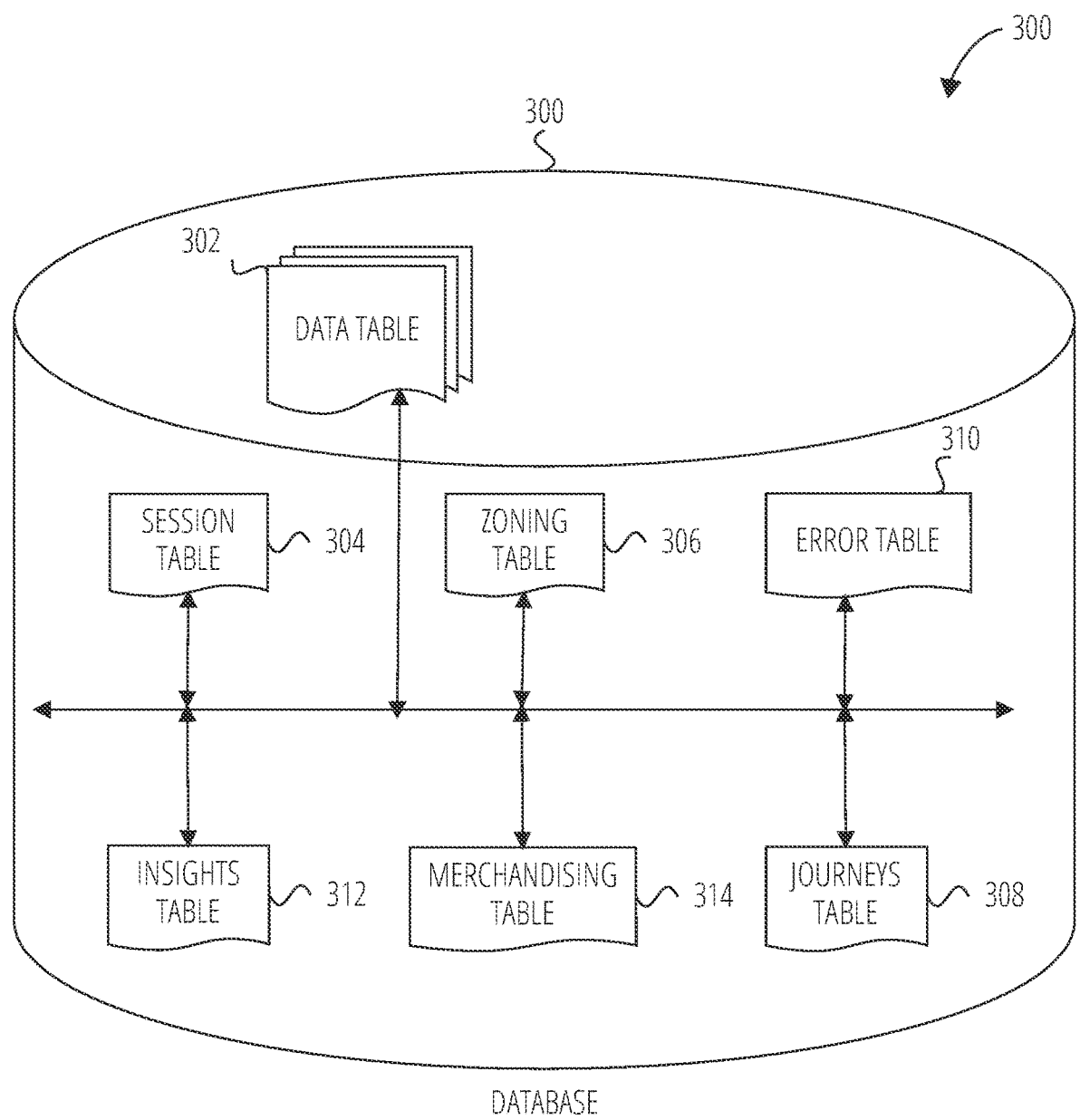
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the experience analytics server 116. For example, the data in the merchandising table 314 can include the product catalog for each of the clients, information on the competitors of each of the clients, the data associated with the products on the websites and applications, the analytics on the product opportunities and the performance of the products based on the zones in the website or application, etc. In addition, the merchandising table 314 can include analytics for when products are sold together (e.g., and the frequency of such combined sales), for cross-selling purposes as described herein.

Figure 4:
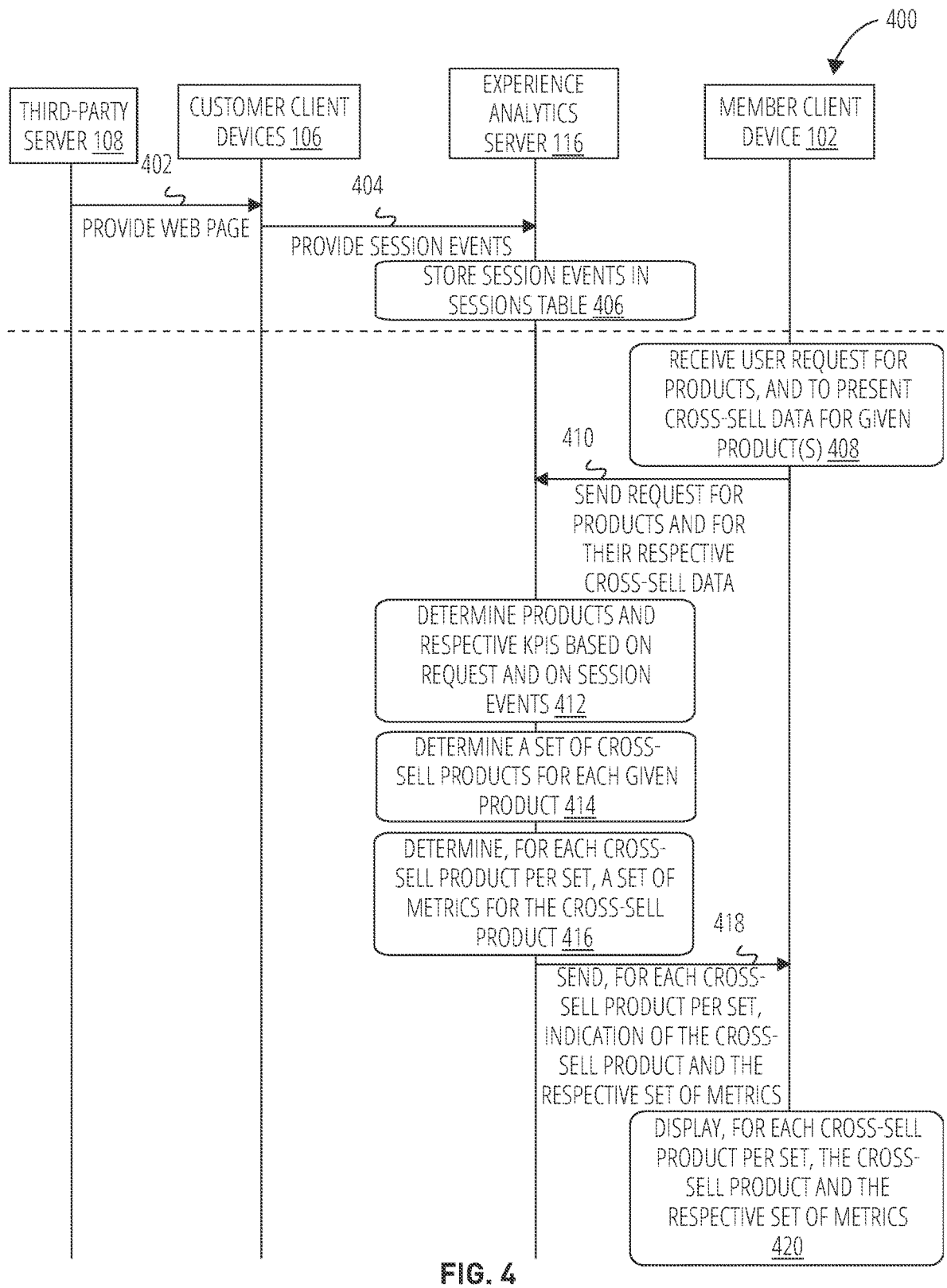
FIG. 4 is an interaction diagram illustrating a process for presenting cross-sell products for a given product, in accordance with some examples.

FIG. 4 is an interaction diagram illustrating a process 400 for presenting cross-sell products for a given product, in accordance with some examples. For explanatory purposes, the process 400 is primarily described herein with reference to the member client device 102, the customer client devices 106, the third-party server 108, and the experience analytics server 116 of FIG. 1. However, one or more blocks (or operations) of the process 400 may be performed by one or more other components, and/or by other suitable devices. Further for explanatory purposes, the blocks (or operations) of the process 400 are described herein as occurring in serial, or linearly. However, multiple blocks (or operations) of the process 400 may occur in parallel or concurrently. In addition, the blocks (or operations) of the process 400 need not be performed in the order shown and/or one or more blocks (or operations) of the process 400 need not be performed and/or can be replaced by other operations. The process 400 may be terminated when its operations are completed. In addition, the process 400 may correspond to a method, a procedure, an algorithm, etc.

In the example of FIG. 4, operations 402-406 correspond to a first phase which relates to storing website session events (e.g., user interactions). Moreover, operations 408-420 correspond to a second phase which relates to presenting cross-sell products and corresponding metrics for given product(s). It may be understood that the second phase may occur shortly after the first phase, or after an extended period of time after the first phase. As such, FIG. 4 includes a dashed line separating the first phase and the second phase for illustrative purposes.

At operation 402, the third-party server 108 provides a web page to one or more customer client devices 106. As noted above, a user at a customer client device 106 can access a website (e.g., corresponding to a member of the experience analytics system 100) that is hosted on the third-party server 108 via the network 110 using an Internet browsing application.

The customer client devices 106 provides session events to the experience analytics server 116 (operation 404). In one or more embodiments, the session events are user interactions with one or more elements, sections, zones (e.g., as defined by the zoning system 206), or the like, of the webpage provided at operation 402. Session events may include user input of entering text in a text box, clicking a button with a mouse, tapping a button with a touchscreen, navigating to a webpage, navigating away from a webpage, scrolling up or down on the webpage, hovering over a webpage element, URL(s) visited, time spent on a certain web page, purchases made, items placed in a cart, and the like, as well as any combination thereof.

In one or more embodiments, the experience analytics server 116 is configured to associate particular session events based on identifiers assigned to products based on product catalog(s). As noted above, the merchandising table 314 is configured to store the product catalog, which includes granular data (e.g., attributes) for the various products made available by a website. It is possible for a website to provide multiple product catalogs, for example, corresponding to different geographical regions (e.g., continents, countries, states).

In one or more embodiments, the experience analytics server 116 is configured to generate the product catalog based on a catalog file provided by an administrator (e.g., agent) of the client corresponding to the website. The catalog file identifies the list of products made available by the website. For each listed product, the catalog file includes product attributes such as, but not limited to: all categories and sub-categories associated with the product (e.g., guys>bottoms>jeans), a brand of the product, a stock-keeping unit (SKU) of the product, a European Article Numbers (EAN) of the product, a price of the product and any minimum and/or maximum prices associated therewith, stock information for the product and/or variants of the product. In one or more embodiments, the session events provided at operation 404 include or otherwise indicate one or more of these product attributes.

At block 406, the experience analytics server 116 continuously stores the session events in the session table 304 of the database 300. For example, the data management system 202 is configured to receive the session events from the customer client devices 106, and to store the session events in the session table 304 in association with session recording. In one or more embodiments, session recording may be executed by generating one or more logs, lists, and the like, of such events, as detected by an experience analytics script 122 included in the webpage accessed by the customer client devices 106. Such logs, lists, and the like, may include one or more event descriptors including the event type, the event target, such as a specific button or text box, the event time, and the like, as well as combinations thereof.

In one or more embodiments, the session events are aggregated across multiple customer client devices 106 accessing the website (e.g., all website customers), and for an extended period of time (e.g., a month, a year, or the like). In this manner, a sufficient amount of user interactions with respect to purchases is recorded, for example, to generate cross-sell data for given products.

Storage of session events in the session table 304 may include storage of events in one or more formats including, as examples and without limitation, sets of session events, single-feature session replays, such as session-length recordings, other, like, formats, and any combination thereof. Further, storage of session recordings may include the storage of one or more associated data features, including, as examples and without limitation, analytic data, metadata, and the like, as well as any combination thereof.

As noted above, operations 408-420 correspond to the above-noted second phase and relate to a member client device 102. The member client device 102 may correspond to a client (e.g., a retail store) of the experience analytics system 100, where the client has a website hosted on the third-party server 108. The user of the member client device 102 may be an agent (e.g., a web administrator, an employee, etc.) of the client. In addition, the member client device 102 includes the experience analytics client 104.

As discussed below with respect to FIG. 5, the merchandising system 212 provides for display of a user interface with interface element(s) which are user-selectable to browse products based on one or more product attributes. For example, the user interface includes respective interface elements to: select a particular product catalog for a website (e.g., based on region such as continent, country and/or state): browse products by brand, by one or more categories (and/or sub-categories), or by a specific product; browse products by device (e.g., desktop, mobile, tablet, or combinations thereof); browse products by time period; and/or browse products by segment (e.g., various user segments based on goals, user actions, session attributes and/or merchandising actions as discussed below with respect to FIG. 5).

Thus, the user interface allows a user (e.g., agent) to select a product catalog, and to browse products based on context (e.g., category, brand, or specific product), device, time period and/or segment. The merchandising system 212 is configured to determine one or more given product(s) based on the user selections.

In addition, the user interface includes an interface element which is user-selectable to present cross-sell data for the given product(s). Thus, at block 408, the member client device 102 receives a user request for products, and to present cross-sell data for the given product(s). The request may indicate one or more product attributes (e.g., context, device, time period, segment) selected by the user, in order to browse products. In response, the member client device 102 sends a request to determine the product(s) for browsing, and to determine cross-sell products that relate to such product(s) (operation 410).

At block 412, the experience analytics server 116 determines the products that match the attributes selected by the user at block 408, based on respective product attributes as stored in the product catalog(s). The experience analytics server 116 further determines Key Performance Indicators (KPIs) for the product(s) based on the request and the session events.

For example, the data analysis system 204 is configured to analyze the session events as stored in the session table 304 in association with the product catalog stored in the merchandising table 314. The data analysis system 204 is configured to perform data science and data engineering processes on the stored session data, in order to generate KPIs for each product. For example, the data analysis system 204 determines the KPIs based on session events corresponding to product purchases from a user's session with the website (e.g., products in the user's cart during purchase). The KPIs may be limited to the time period specified by the user at block 408.

In one or more embodiments, KPIs are determined on a per-product basis. For a given product, examples of KPIs include, but are not limited to:
- a number of conversions which corresponds to the number of sessions with at least one conversion (e.g., purchase) of the product, and is calculated as the number of sessions with at least one conversion of the product;
- a cross-sale rate which corresponds to the percentage of times the given product was purchased with at least one other product, and is calculated as the number of conversions with at least one other product divided by the number of conversions of the given product;

a number of conversions together which corresponds to the number of conversions with the given product, and is calculated as the sum of conversions where both the given product and the cross-sell product were purchased together;

a sold together rate which corresponds to the percentage of times the cross-sell product was purchased with the given product, and is calculated as the number of conversions together divided by the number of conversions of the given product;

a number of views together which corresponds to the number of views of the cross-sell product with the selected product during a session, and is calculated as the sum of the views of the given product with the cross-sell product during a session;

a viewed together rate which corresponds to the percentage of times the cross-sell product was viewed together with the given product during a session, and is calculated as the number of views together divided by the number of conversions of the given product;

a revenue together, indicating a total revenue for instances when the cross-sell product was purchased together with the at least one product, and is calculated as the sum of the revenue for times when the cross-sell product was purchased together with the given product;

a max sold together rate which corresponds to the percentage of times the highest cross-sell product was purchased with the given product, and is calculated as the number of conversions together with the highest cross-sell product divided by the number of conversions of the given product; and a number of sessions which corresponds to the number of visits, and is calculated as the number of pageviews of the product page(s).

At block 414, the experience analytics server 116 determines a set of cross-sell products for each of the given product(s) in the list. Using the KPIs for each given product, the merchandising system 212 is configured to rank cross-sell products based on those having the highest sold together rate with respect to the given product. As such, each given product is associated with a set of cross-sell products. For each cross-sell product within a set, the experience analytics server 116 determines a respective set of metrics for the cross-sell product (block 416). The set of metrics corresponds to a predetermined set of KPIs (e.g., as determined by an administrator of the experience analytics system 100). For example, for each cross-sell product per set associated with a given product, the data analysis system 204 determines one or more of the sold together rate, the number of conversions together, the number of views together, the viewed together rate and/or the revenue together (e.g., based on the user-specified time period). At operation 418, the experience analytics server 116 sends, for each cross-sell product per set, an indication of the cross-sell product and the respective set of metrics.

At block 420, the member client device 102 displays, for each cross-sell product per set of cross-sell products (e.g., where each set of cross-sell products corresponds to a given product), the respective set of metrics for the cross-sell product. For example, in a case where the set of metrics includes the sold together rate, the member client device 102 displays the list of cross-sell products per given product in order (e.g., descending order) based on the sold together. It is noted that the ordering of the list of cross-sell products per given product is not limited to sold together rate, and the member client device 102 may instead order the list of cross-sell products based on alternate KPIs (e.g., number of conversions together, number of views together, viewed together rate, or revenue together).

Figure 5:
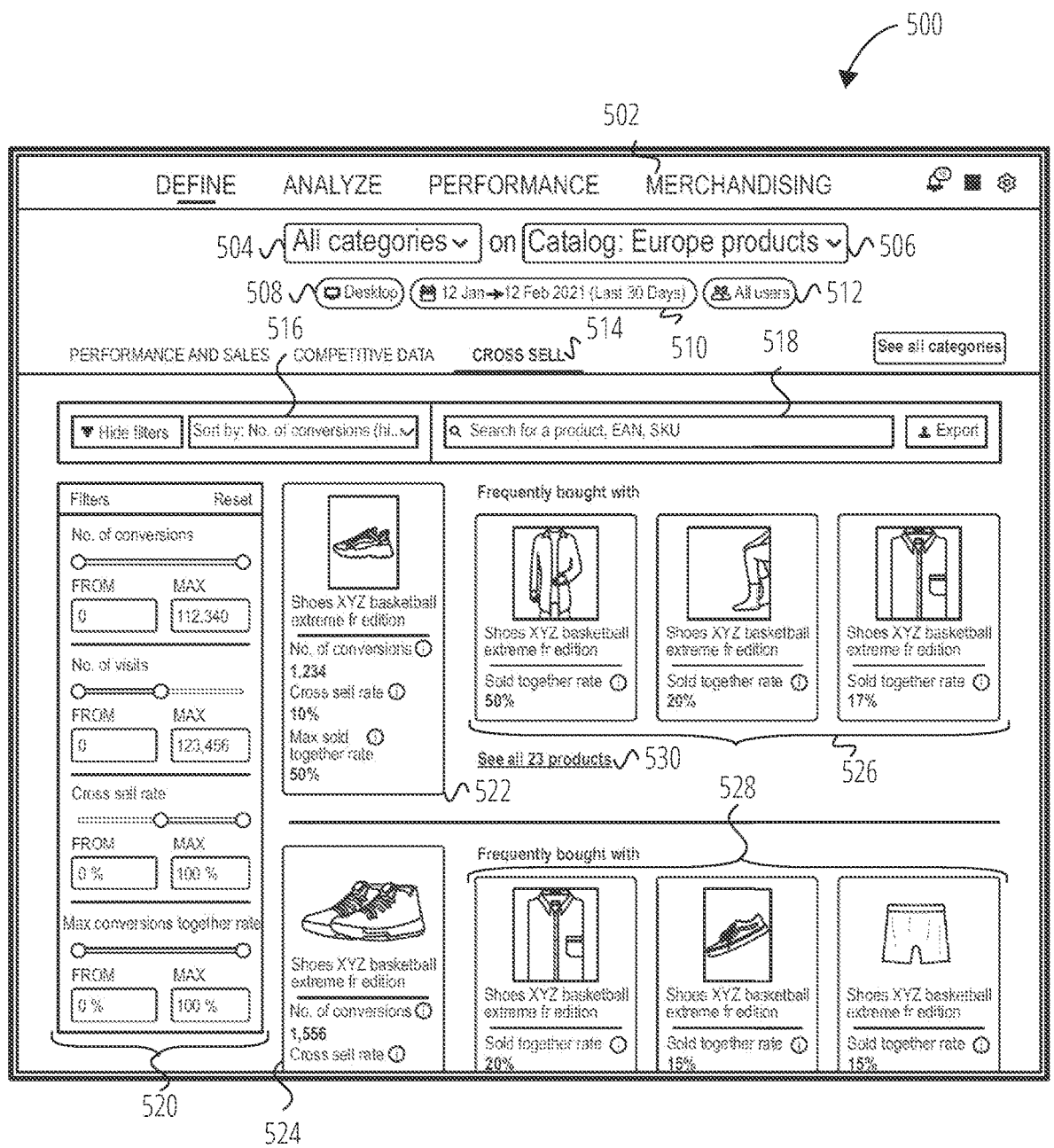
FIG. 5 illustrates an example user interface for browsing products and displaying cross-sell data for the products, in accordance with some examples.

FIG. 5 illustrates an example user interface 500 for browsing products and displaying cross-sell data for the products, in accordance with some examples. The user interface 500 is displayable on a member client device 102, which is operated by an agent (e.g., a web administrator, an employee, etc.) of the client corresponding to a website. The user interface 500 includes a merchandising interface tab 502, a context selector 504, a catalog selector 506, a device selector 508, a time period selector 510, a segment selector 512 a sort button 516, a product search input box 518, filters 520, products 522-524 and sets of cross-sell products 526-528.

In one or more embodiments, the user interface 500 corresponds to a merchandising interface which is activated by user selection of the merchandising interface tab 502. The merchandising system 212 may provide for display of the user interface 500, corresponding to the above-mentioned merchandising interface, based on KPIs determined by the data analysis system 204. As noted above, the KPIs are based at least in part on data stored within the merchandising table 314 (e.g., product catalogs) and/or the session table 304 (e.g., session activity). In one or more embodiments, KPIs are calculated in real-time to accommodate user-specified time periods as described herein.

The context selector 504 is user-selectable to browse products by category (and/or subcategory), brand and/or a specific product. The catalog selector 506 is user-selectable to browse products based on product catalog. For example, a product catalog may vary based on region (e.g., continent, country, state) with respect to available products, pricing, and the like. The device selector 508 is user-selectable to browse products based on the device used at the time of recording the session events. For example, the user may select between a desktop, mobile, tablet, or combinations thereof (e.g., all devices). The time period selector 510 allows the user to select a specific time period of the session events from which the KPIs are based. For example, the time period selector 510 allows the user to select among predefined time period (e.g., last 7 days, last month, last quarter, last year) and/or to select a custom date range.

The segment selector 512 is user-selectable to select between different user segments. For example, user segments may be selected based on: goals; user actions including as bounce on page, click recurrence on zone, exit page (by goal), exit page (by goal), exit page (path), exit zone (last hovered), hesitation time on zone, hover time on zone, landing page (by goal), landing page (by path), number of pages viewed, page event, page reached, page viewed, scroll rate of page, time before first click on zone, time spent on page, zone clicked, zone hovered; session attributes including browser, custom variable, e-commerce transaction, error, geographical location, language, new/returning, number of sessions, operating system, referring URL, screen resolution, session duration; merchandising actions including category/brand product page views, category/brand purchase, product add to cart, product page views, product purchase; and combinations thereof.

Thus, the user interface 500 provided by the merchandising system 212 allows a user (e.g., agent) to browse products based on category, brand or a specific product, and further based on selections via the selectors 506-512. The user interface 500 further includes sort button 516 which is user-selectable to sort the given product(s) according to different KPIs (e.g., by number of conversions in the example of FIG. 5), and a product search input box 518 to search for specific products by name, EAN and/or SKU.

In the example of FIG. 5, the given product(s) are listed as products 522-524. The cross-sell tab 514 is user-selectable to present cross-sell data for the given products. In response to user selection of the cross-sell tab 514, the user interface 500 displays cross-sell data (e.g., corresponding to KPIs) for each given product. As noted above, the KPIs may be determined in real-time by the data analysis system 204. Each of the given products 522-524 is depicted with an image of the product, the product name, number of conversions and cross-sell rate for that product.

For each given product, the user interface 500 presents a respective set of cross-sell products that product. For example, the product 522 is accompanied by a set of cross-sell products 526, and the 524 is accompanied by a set of cross-sell products 528. As noted above, the sets of cross-sell products 526-528 respectively correspond to those products previously sold together with the given products 522-524, and are presented in descending order based on highest ranking of sold together rate (e.g., to highlight cross-sell products that are most often sold with given products). Moreover, each of the sets of cross-sell products 526-528 is depicted with an image of the cross-sell product, and the sold-together rate with respect to the given product.

In one or more embodiments, the filters 520 allow the user to filter the sets of cross-sell products 526-528. For example, the user may select value ranges with respect to the number of conversions, the number of visits, the cross-sell rate and/or the maximum number of conversions together. The data analysis system 204 in conjunction with the merchandising system 212 is configured to filter the given products 522-524 and/or the sets of cross-sell products 526-528 based on the user-submitted values.

In one or more embodiments, each of the sets of cross-sell products 526-528 includes a user-selectable button 530 to see all products. Selection of the button 530 causes the experience analytics server 116 to open a panel (e.g., overlay) dedicated to products sold with the given product (e.g., the product 522), as discussed below with respect to FIG. 6. Moreover, each of the given products 522-524 is user-selectable to refine searching to a specific product. This is discussed further below with respect to FIG. 7.

Figure 6:
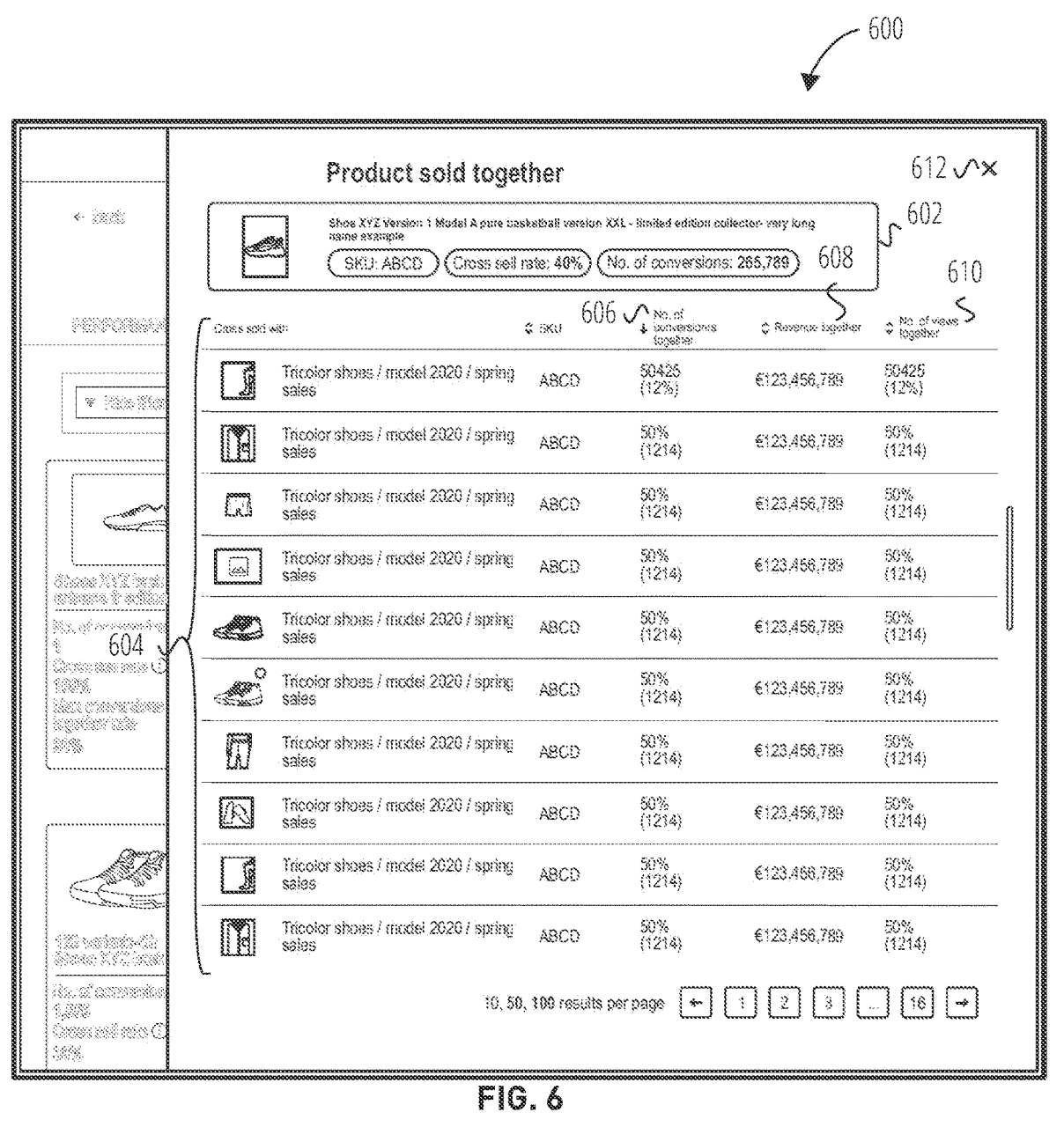

FIG. 6 illustrates an example user interface 600 for expanding the list of products to cross-sell with respect to a specific product, in accordance with some examples. The user interface 600 includes product information 602, expanded set of cross-sell products 604, number of conversions together column 606, revenue together column 608 and number of views together column 610.

As noted above, the user interface 600 may be surfaced in response to user selection of the button 530. The user interface 600 may be displayed as an overlay with respect to the user interface 500. The user interface 600 may be closed via user selection of a close button 612.

In one or more embodiments, the user interface 600 presents further cross-sell data for the given product. For example, the product information 602 indicates additional information specific to the given product relative to that shown in FIG. 5 (e.g., the product 522). In one or more embodiments, the product information 602 includes, but is not limited to the given product: name, image, SKU, cross-sell rate, and number of conversions.

Moreover, the expanded set of cross-sell products 604 provides an expanded list of cross-sell products relative to that shown in FIG. 5 (e.g., the set of cross-sell products 526), as well as additional information for each cross-sell product. In one or more embodiments, the expanded set of cross-sell products 604 is depicted as a list which is ordered by default by number of conversions together, as represented by the number of conversions together column 606.

The number of conversions together column 606 indicates the number of conversions together and the sold together rate (e.g., in parentheses). The revenue together column 608 indicates the revenue together, and the number of views together column 610 indicates the number of views together and the viewed together rate (e.g., in parentheses). For example, the number of views together column 610 allows the end user to quantify the impact of having products (e.g., the given product and cross-sell product) in the cart together. Each of columns 606-610 is user selectable to respectively re-order the expanded set of cross-sell products 604 in a descending or ascending order. The user interface 600 also provides user interface elements for scrolling through the expanded set of cross-sell products 604.

Figure 7:
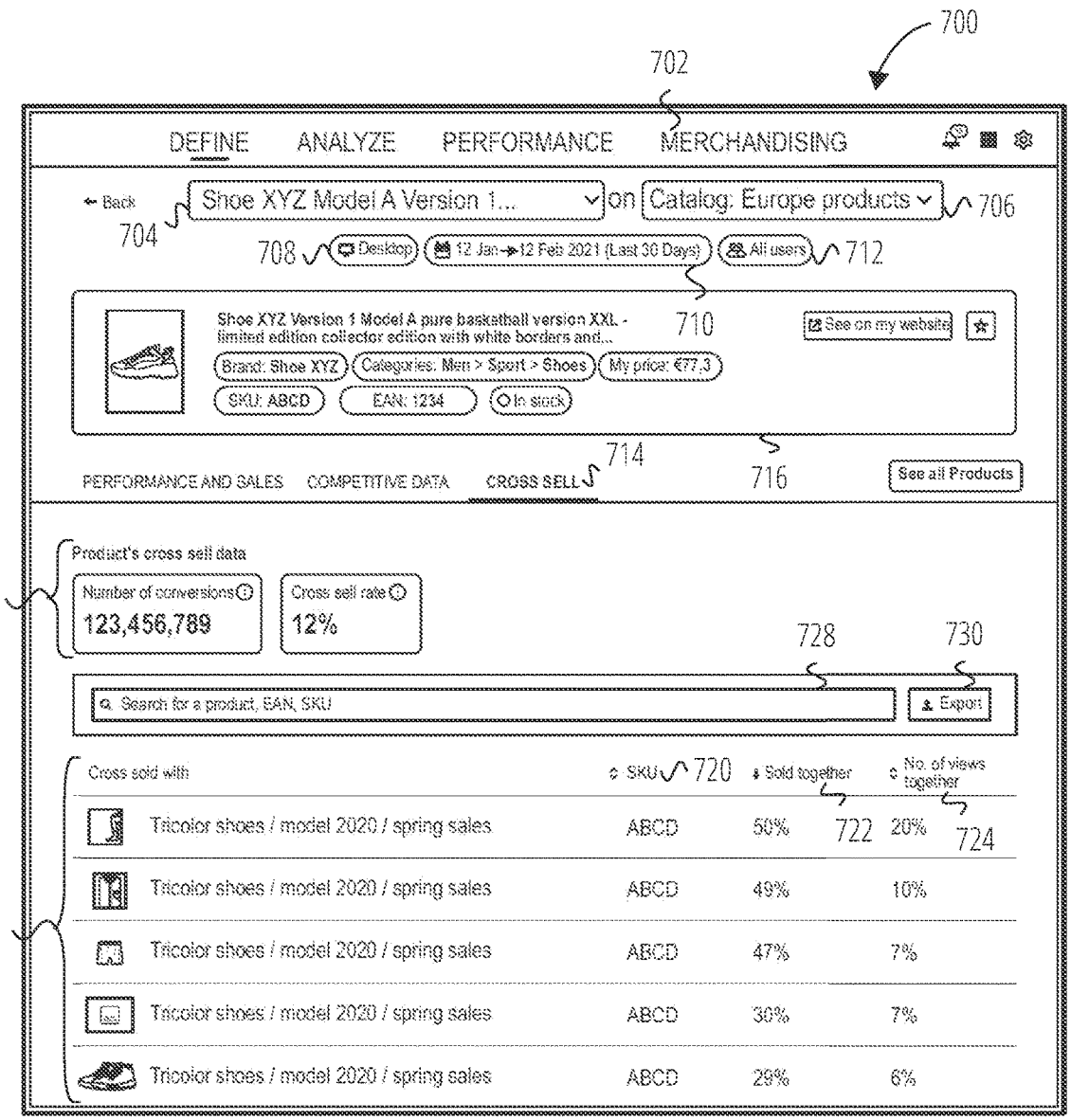
FIG. 7 illustrates an example user interface for presenting cross-sell products for a single given product, in accordance with some examples.

FIG. 7 illustrates an example user interface 700 for presenting cross-sell products for a single given product, in accordance with some examples. The user interface 700 includes a merchandising interface tab 702, a context selector 704, a catalog selector 706, a device selector 708, a time period selector 710, a segment selector 712, a cross-sell tab 714, product information 716, an expanded set of cross-sell products 718, an SKU column 720, a sold together rate column 722, a number of views together column 724, product cross-sell data 726, a product search input box 728 and an export button 730.

In one or more embodiments, the user interface 700 is accessed from user selection of a specific product via the user interface 500 of FIG. 5. For example, the user may select a specific product via the product search input box 518 of FIG. 5. Alternatively or in addition, the user interface 700 is accessed by user input (e.g., user click) of the cross-sell tab from a specific product performance interface (e.g., not shown, but similar to the cross-sell tab 514).

In one or more embodiments, interface elements 702-714 of FIG. 7 are configured to perform functionality at least partially similar to that of elements 502-514 of FIG. 5. For example, the user interface 700 corresponds to a merchandising interface which is activated by user selection of the merchandising interface tab 702. In addition, the context selector 704 is user-selectable to browse products by category (and/or subcategory), brand and/or a specific product, the catalog selector 706 is user-selectable to browse products based on product catalog (e.g., by region), the device selector 508 is user-selectable to browse products based on the device used at the time of recording the session events (e.g., desktop, mobile, tablet, or combinations thereof), the time period selector 710 allows the user to select a specific time period of the session events from which the KPIs are based (e.g., last 7 days, month, quarter, year and/or a custom date range), and the segment selector 712 is user-selectable to select between different user segments.

In addition, the cross-sell tab 714 is user-selectable to present cross-sell data for the given product, attributes of which are included in the product information 716. For example, the product information 716 includes a representative image, the brand, categories (or sub-categories), price, SKU, EAN and stock availability of the given product.

In response to user selection of the cross-sell tab 714, the user interface 700 displays cross-sell data (e.g., corresponding to KPIs) for each given product. As noted above, the KPIs may be determined in real-time by the data analysis system 204. For the given product itself, KPIs appear in the product cross-sell data 726, which indicates the number of conversions and the cross-sell rate.

For the cross-sell products, the interface elements 718-724 of FIG. 7 are configured to perform functionality at least partially similar to that of elements 604-610 of FIG. 6. For example, the expanded set of cross-sell products 718 is depicted as a list which is ordered by default by sold together rate, as represented by the sold together rate column 722.

The sold together rate column 722 indicates the sold together rate (e.g., in parentheses) for the given product and respective cross-sell product. The SKU column 720 indicates the SKU for the cross-sell product. The number of views together column 610 indicates the viewed together rate (e.g., to quantify the impact of having products in the cart together). Each of columns 720-724 is user selectable to respectively re-order the expanded set of cross-sell products 718 in a descending or ascending order. The user interface 700 may also provide user interface elements for scrolling through the expanded set of cross-sell products 718. While not shown in the example of FIG. 7, the user interface 700 may include additional columns (e.g., a revenue together column, similar to FIG. 6) for the expanded set of cross-sell products 718.

In one or more embodiments, the product search input box 728 allows for the user (e.g., agent) to search for specific products by name, EAN and/or SKU. In addition, the export button 730 is user-selectable to locally download a file (e.g., an .xlsx file) containing metrics (e.g., without images) displayed in the user interface 700. For example, the file corresponds to a table with a predefined top number (e.g., 10) of cross-sold products.

Figure 8:
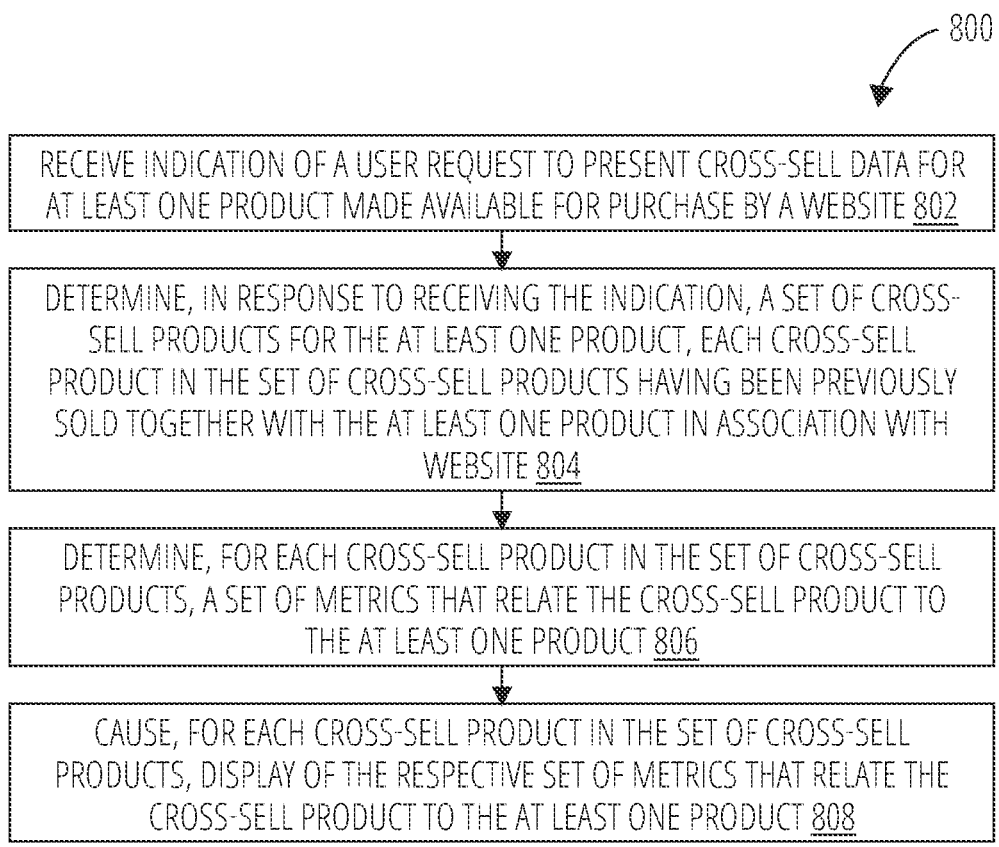
FIG. 8 is a flowchart illustrating a process for presenting cross-sell products for a given product, in accordance with some examples.

FIG. 8 is a flowchart illustrating a process 800 for presenting cross-sell products for a given product, in accordance with some examples. For explanatory purposes, the process 800 is primarily described herein with reference to the experience analytics server 116 of FIG. 1. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The experience analytics server 116 receives indication of a user request to present cross-sell data for at least one product made available for purchase by a website (block 802).

The experience analytics server 116 determines, in response to receiving the indication, a set of cross-sell products for the at least one product, each cross-sell product in the set of cross-sell products having been previously sold together with the at least one product in association with website (block 804).

The experience analytics server 116 determines, for each cross-sell product in the set of cross-sell products, a set of metrics that relate the cross-sell product to the at least one product (block 806).

The experience analytics server 116 causes, for each cross-sell product in the set of cross-sell products, display of the respective set of metrics that relate the cross-sell product to the at least one product (block 808).

The experience analytics server 116 may receive indication of a second user selection to view products at a product level, a category level or a brand level, the products being made available for purchase by the website, and determine the at least one product based on the second user selection. In a case where the at least one product corresponds to plural products, determining the set of cross-sell products, determining the set of metrics, and causing display of the respective set of metrics are performed for each product of the plural products.

The experience analytics server 116 may cause display of a number of conversions for the at least one product, the number of conversions indicating a number of times that the at least one product was purchased. Moreover, the experience analytics server 116 may cause display of a cross-sell rate for the at least one product, the cross-sell rate indicating a percentage of times that the at least one product had been purchased with at least one cross-sell product.

For each cross-sell product in the set of cross-sell products, the respective set of metrics may include one or more of: a number of conversions together, indicating a number of times that the cross-sell product was purchased together with the at least one product; a sold together rate, indicating a percentage of times that the cross-sell product was purchased together with the at least one product; a number of views together, indicating a number of times that the cross-sell product was viewed together with the at least one product in a same browsing session; a viewed together rate, indicating a percentage of times that the cross-sell product was viewed together with the at least one product in a same browsing session; a revenue together, indicating a total revenue for instances when the cross-sell product was purchased together with the at least one product.

Determining the set of metrics for each cross-sell product may include calculating key performance indicators (KPIs) that relate the cross-sell product to the at least one product, the KPIs being based at least in part on prior session events related to purchase of the at least one product.

Machine Architecture

Figure 9:
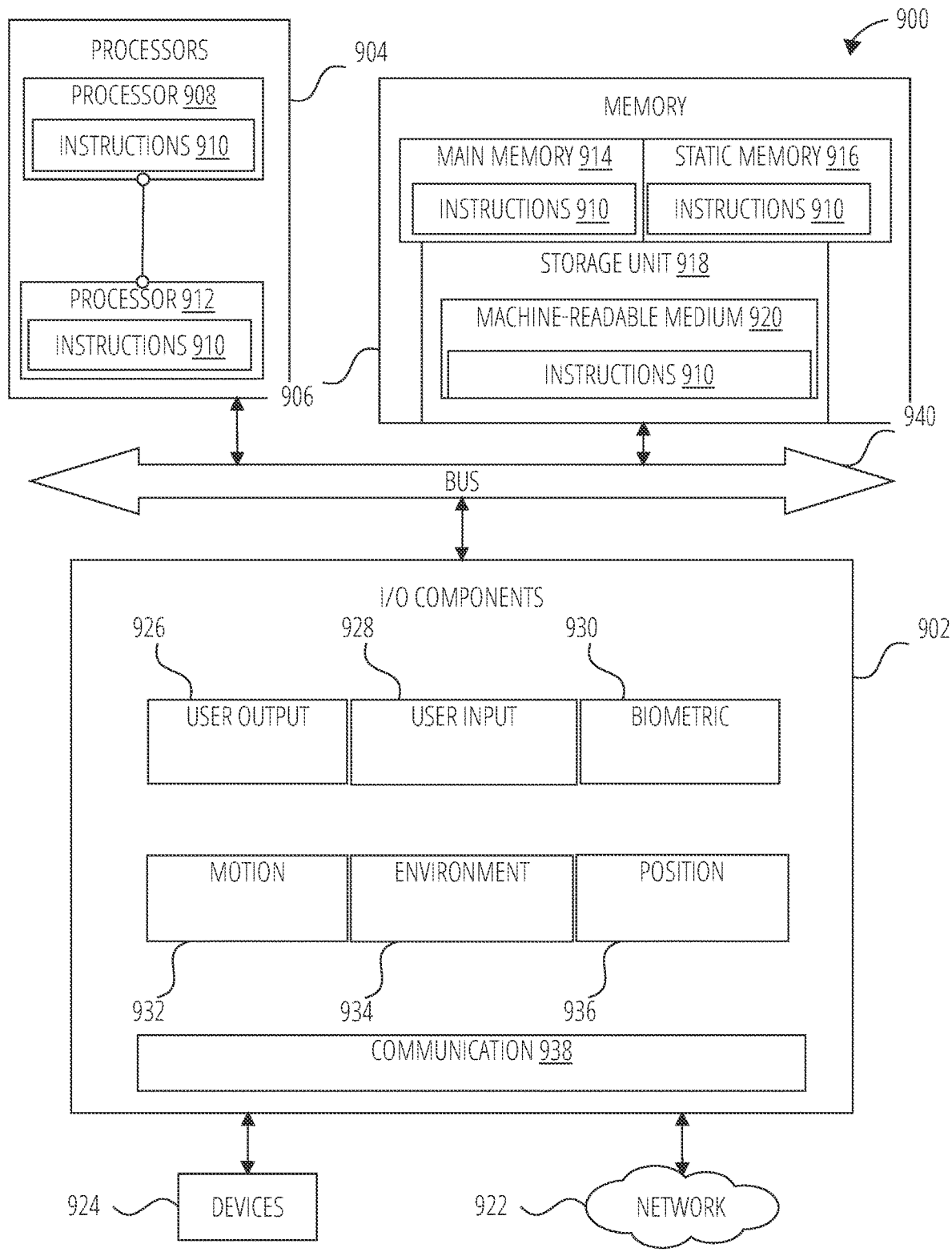
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an application, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the member client device 102 or any one of a number of server devices forming part of the experience analytics server 116. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
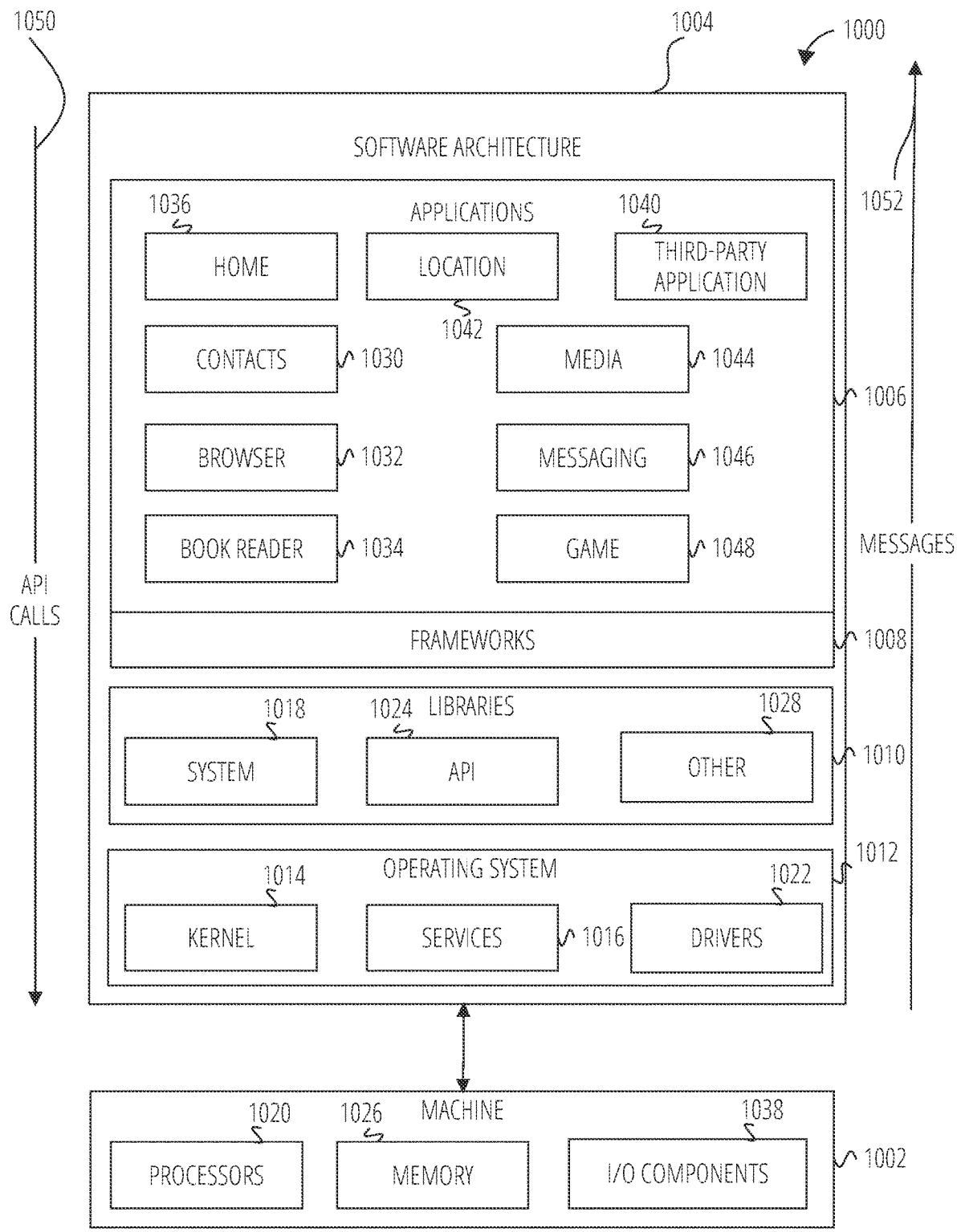
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   providing client-side scripts for one or more first devices that access a website, the client-side scripts being configured to record session data corresponding to user interaction with the website;
   generating session events based on the session data recorded using the client-side scripts;
   causing display of a first interface on a second device, the first interface including respective interface elements for browsing available products by product catalog for geographical regions supported by a website, by device type used at a time of recording session events for the website, by time period of the sessions events, and by user segment,
   wherein the respective interface element for the user segment is for browsing the available products based on user interaction relating to zones of the website and on session attributes associated with the session events;
   receiving indication of user input, via the first interface, to browse by one or more of the product catalog, the device type, the time period or the user segment;
   determining, in response to receiving the indication, at least one product corresponding to the user input and a set of cross-sell products for the at least one product, each cross-sell product in the set of cross-sell products having been previously sold together with the at least one product in association with website;
   causing display of a second interface on the second device, the second interface including, for each cross-sell product in a subset the set of cross-sell products, respective metrics that relate the cross-sell product to the at least one product, the second interface further including an expand button which is user-selectable to view respective metrics for all of the set of cross-sell products;
   causing, in response to user selection of the expand button, display of a third interface as an overlay on top of the second interface, the third interface including, for each cross-sell product in the set of cross-sell products, respective metrics that relate the cross-sell product to the at least one product, each respective metric being arranged in a column with a user-selectable button for re-ordering the set of cross-sell products based on the respective metric;
   causing display of a fourth interface on the second device, the fourth interface being configured to receive user selection of a session, from among plural user sessions with the website, for replay on the second device, the plural user sessions corresponding to different versions of the web site; and
   reconstructing, upon receiving user selection of the session via the fourth interface, a video of the session based on the generated session events corresponding to the session, for replay on the second device.

2. The method of claim 1, wherein the interface elements are further for browsing by context including product category, brand and specific product, and wherein the user input via the first interface corresponds at least in part to browsing by the context.

3. The method of claim 1, wherein the at least one product comprises plural products, and
wherein determining the set of cross-sell products, causing display of the second interface, and causing display of the third interface are performed for each product of the plural products.

4. The method of claim 1, further comprising:
causing display of a number of conversions for the at least one product, the number of conversions indicating a number of times that the at least one product was purchased.

5. The method of claim 1, further comprising:
causing display of a cross-sell rate for the at least one product, the cross-sell rate indicating a percentage of times that the at least one product had been purchased with at least one cross-sell product.

6. The method of claim 1, wherein for each cross-sell product in the set of cross-sell products, the respective metrics include a number of conversions together, indicating a number of times that the cross-sell product was purchased together with the at least one product.

7. The method of claim 1, wherein for each cross-sell product in the set of cross-sell products, the respective metrics include a sold together rate, indicating a percentage of times that the cross-sell product was purchased together with the at least one product.

8. The method of claim 1, wherein for each cross-sell product in the set of cross-sell products, the respective metrics include a number of views together, indicating a number of times that the cross-sell product was viewed together with the at least one product in a same browsing session.

9. The method of claim 1, wherein for each cross-sell product in the set of cross-sell products, the respective metrics include a viewed together rate, indicating a percentage of times that the cross-sell product was viewed together with the at least one product in a same browsing session.

10. The method of claim 1, wherein for each cross-sell product in the set of cross-sell products, the respective metrics include a revenue together, indicating a total revenue for instances when the cross-sell product was purchased together with the at least one product.

11. The method of claim 1, wherein determining the set of metrics for each cross-sell product comprises calculating key performance indicators (KPIs) that relate the cross-sell product to the at least one product, the KPIs being based at least in part on prior session events related to purchase of the at least one product.

12. The method of claim 1, wherein the user interaction relating to zones comprises a click recurrence for each zone, an exit zone, a hesitation time for each zone, a hover time for each zone, and a time before a first click for each zone.

13. The method of claim 1, wherein the one or more first devices correspond to visitors of the web site, and
wherein the second device corresponds to a host of the website.

14. A system comprising:
a processor; and
a memory storing instructions that, when executed by the processor, configure the processor to perform operations comprising:
providing client-side scripts for one or more first devices that access a website, the client-side scripts being configured to record session data corresponding to user interaction with the web site;
generating session events based on the session data recorded using the client-side scripts;
causing display of a first interface on a second device, the first interface including respective interface elements for browsing available products by product catalog for geographical regions supported by a website, by device type used at a time of recording session events for the website, by time period of the sessions events, and by user segment,
wherein the respective interface element for the user segment is for browsing the available products based on user interaction relating to zones of the website and on session attributes associated with the session events;
receiving indication of user input, via the first interface, to browse by one or more of the product catalog, the device type, the time period or the user segment;
determining, in response to receiving the indication, at least one product corresponding to the user input and a set of cross-sell products for the at least one product, each cross-sell product in the set of cross-sell products having been previously sold together with the at least one product in association with website;
causing display of a second interface on the second device, the second interface including, for each cross-sell product in a subset the set of cross-sell products, respective metrics that relate the cross-sell product to the at least one product, the second interface further including an expand button which is user-selectable to view respective metrics for all of the set of cross-sell products;
causing, in response to user selection of the expand button, display of a third interface as an overlay on top of the second interface, the third interface including, for each cross-sell product in the set of cross-sell products, respective metrics that relate the cross-sell product to the at least one product, each respective metric being arranged in a column with a user-selectable button for re-ordering the set of cross-sell products based on the respective metric;
causing display of a fourth interface on the second device, the fourth interface being configured to receive user selection of a session, from among plural user sessions with the website, for replay on the second device, the plural user sessions corresponding to different versions of the web site; and
reconstructing, upon receiving user selection of the session via the fourth interface, a video of the session based on the generated session events corresponding to the session, for replay on the second device.

15. The system of claim 14, wherein the interface elements are further for browsing by context including product category, brand and specific product, and
wherein the user input via the first interface corresponds at least in part to browsing by the context.

16. The system of claim 14, wherein the at least one product comprises plural products, and
wherein determining the set of cross-sell products, causing display of the second interface, and causing display of the third interface are performed for each product of the plural products.

17. The system of claim 14, the operations further comprising:
causing display of a number of conversions for the at least one product, the number of conversions indicating a number of times that the at least one product was purchased.

18. The system of claim 14, the operations further comprising:
   causing display of a cross-sell rate for the at least one product, the cross-sell rate indicating a percentage of times that the at least one product had been purchased with at least one cross-sell product.

19. The system of claim 14, wherein for each cross-sell product in the set of cross-sell products, the respective metrics include a number of conversions together, indicating a number of times that the cross-sell product was purchased together with the at least one product.

20. A non-transitory computer-readable storage medium, the computer-readable storage medium including instructions that when executed by a computer, cause the computer to perform operations comprising:
   providing client-side scripts for one or more first devices that access a website, the client-side scripts being configured to record session data corresponding to user interaction with the web site;
   generating session events based on the session data recorded using the client-side scripts;
   causing display of a first interface on a second device, the first interface including respective interface elements for browsing available products by product catalog for geographical regions supported by a website, by device type used at a time of recording session events for the website, by time period of the sessions events, and by user segment,
   wherein the respective interface element for the user segment is for browsing the available products based on user interaction relating to zones of the website and on session attributes associated with the session events;
   receiving indication of user input, via the first interface, to browse by one or more of the product catalog, the device type, the time period or the user segment;
   determining, in response to receiving the indication, at least one product corresponding to the user input and a set of cross-sell products for the at least one product, each cross-sell product in the set of cross-sell products having been previously sold together with the at least one product in association with website;
   causing display of a second interface on the second device, the second interface including, for each cross-sell product in a subset the set of cross-sell products, respective metrics that relate the cross-sell product to the at least one product, the second interface further including an expand button which is user-selectable to view respective metrics for all of the set of cross-sell products;
   causing, in response to user selection of the expand button, display of a third interface as an overlay on top of the second interface, the third interface including, for each cross-sell product in the set of cross-sell products, respective metrics that relate the cross-sell product to the at least one product, each respective metric being arranged in a column with a user-selectable button for re-ordering the set of cross-sell products based on the respective metric;
   causing display of a fourth interface on the second device, the fourth interface being configured to receive user selection of a session, from among plural user sessions with the website, for replay on the second device, the plural user sessions corresponding to different versions of the web site; and
   reconstructing, upon receiving user selection of the session via the fourth interface, a video of the session based on the generated session events corresponding to the session, for replay on the second device.

\* \* \* \* \*

UNITED STATES PATENT AND TRADEMARK OFFICE
CERTIFICATE OF CORRECTION

PATENT NO. : 11,948,162 B2
APPLICATION NO. : 17/732044
DATED : April 2, 2024
INVENTOR(S) : Colombier et al.

Page 1 of 1

It is certified that error appears in the above-identified patent and that said Letters Patent is hereby corrected as shown below:

In the Specification

In Column 10, Line 13, delete "state):" and insert --state);-- therefor

In Column 17, Line 37, delete "906," and insert --914,-- therefor

In the Claims

In Column 24, Line 60, in Claim 1, delete "web site;" and insert --website;-- therefor In Column 25, Line 56, in Claim 13, delete "web site," and insert --website,-- therefor In Column 25, Line 67, in Claim 14, delete "web site;" and insert --website;-- therefor In Column 26, Line 46, in Claim 14, delete "web site;" and insert --website;-- therefor In Column 27, Line 19, in Claim 20, delete "web site;" and insert --website;-- therefor In Column 28, Line 29, in Claim 20, delete "web site;" and insert --website;-- therefor Signed and Sealed this
Thirty-first Day of December, 2024

Derrick Brent
*Acting Director of the United States Patent and Trademark Office*